United States Patent
Abbott, Jr. et al.

(10) Patent No.: US 11,701,830 B2
(45) Date of Patent: *Jul. 18, 2023

(54) EXTRACTION OF DIGITALLY PRINTED BUILD MATERIAL

(71) Applicant: HEWLETT-PACKARD DEVELOPMENT COMPANY, L.P., Spring, TX (US)

(72) Inventors: James Elmer Abbott, Jr., Albany, OR (US); David A. Champion, Corvallis, OR (US); Fernando Juan, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 216 days.

This patent is subject to a terminal disclaimer.

(21) Appl. No.: 17/141,616

(22) Filed: Jan. 5, 2021

(65) Prior Publication Data

US 2021/0122118 A1 Apr. 29, 2021

Related U.S. Application Data

(63) Continuation of application No. 15/757,614, filed as application No. PCT/US2015/066821 on Dec. 18, 2015, now Pat. No. 10,913,208.

(51) Int. Cl.
*B29C 64/20* (2017.01)
*B29C 64/379* (2017.01)
(Continued)

(52) U.S. Cl.
CPC .......... *B29C 64/379* (2017.08); *B29C 64/165* (2017.08); *B29C 64/393* (2017.08);
(Continued)

(58) Field of Classification Search
CPC ... B29C 64/379; B29C 64/393; B29C 64/165; B29C 64/291; B29C 35/0805; B29C 71/02; B33Y 30/00; B33Y 50/02; B33Y 70/00
(Continued)

(56) References Cited

U.S. PATENT DOCUMENTS 7,708,929 B2 5/2010 Monsheimer et al.
2005/0225007 A1 10/2005 Lai et al.
(Continued)

FOREIGN PATENT DOCUMENTS

CN 1270883 A 10/2000
CN 1532043 A 9/2004
(Continued)

OTHER PUBLICATIONS

"Three-Dimensional Additive Manufacturing Using Microwaves"; Aug. 9, 2007; http://www.me.mtu.edu/~rmdsouza/3D_RP.html.

*Primary Examiner* — Jeffrey M Wollschlager
*Assistant Examiner* — Xue H Liu
(74) *Attorney, Agent, or Firm* — Shook, Hardy & Bacon L.L.P.

(57) ABSTRACT

In example implementations, a method for extracting layers of build material into a carrier. The method includes providing a layer of build material onto a bed. Portions of the layer of build material on the bed are digitally printed with a liquid functional material (LFM). The method repeats providing the layer of build material and digitally printing without applying energy to the LFM to define a structure in layers of build material on the bed. The layers of build material are extracted into a carrier and the carrier is removed.

20 Claims, 5 Drawing Sheets

(51) Int. Cl.
- *B33Y 10/00* (2015.01)
- *B29C 64/165* (2017.01)
- *C04B 35/584* (2006.01)
- *C04B 35/185* (2006.01)
- *C04B 35/553* (2006.01)
- *B32B 18/00* (2006.01)
- *C04B 35/46* (2006.01)
- *C04B 35/486* (2006.01)
- *C04B 35/14* (2006.01)
- *C04B 35/053* (2006.01)
- *C04B 35/111* (2006.01)
- *C04B 35/583* (2006.01)
- *C04B 35/653* (2006.01)
- *C04B 35/495* (2006.01)
- *C04B 35/505* (2006.01)
- *B33Y 30/00* (2015.01)
- *B33Y 50/02* (2015.01)
- *B33Y 70/00* (2020.01)
- *B29C 64/393* (2017.01)
- *B29C 71/02* (2006.01)
- *B29C 35/08* (2006.01)
- *B22F 3/105* (2006.01)
- *B29C 64/291* (2017.01)

(52) U.S. Cl.
CPC .............. *B32B 18/00* (2013.01); *B33Y 10/00* (2014.12); *B33Y 30/00* (2014.12); *B33Y 50/02* (2014.12); *B33Y 70/00* (2014.12); *C04B 35/053* (2013.01); *C04B 35/111* (2013.01); *C04B 35/14* (2013.01); *C04B 35/185* (2013.01); *C04B 35/46* (2013.01); *C04B 35/486* (2013.01); *C04B 35/495* (2013.01); *C04B 35/505* (2013.01); *C04B 35/553* (2013.01); *C04B 35/583* (2013.01); *C04B 35/584* (2013.01); *C04B 35/653* (2013.01); *B22F 3/105* (2013.01); *B29C 35/0805* (2013.01); *B29C 64/291* (2017.08); *B29C 71/02* (2013.01); *B29C 2035/0855* (2013.01); *C04B 2235/5436* (2013.01); *C04B 2235/6025* (2013.01)

(58) Field of Classification Search
USPC .......................................................... 264/489
See application file for complete search history.

(56) References Cited

U.S. PATENT DOCUMENTS

| | | |
|---|---|---|
| 2010/0273008 A1 | 10/2010 | Burckhardt |
| 2011/0252618 A1 | 10/2011 | Diekmann |
| 2012/0291701 A1 | 11/2012 | Grasegger |
| 2014/0170398 A1 | 6/2014 | Carlson et al. |
| 2015/0034123 A1 | 2/2015 | Pressacco |
| 2015/0054204 A1 | 2/2015 | Tseliakhovich et al. |
| 2015/0084240 A1 | 3/2015 | Shuck et al. |
| 2015/0248504 A1 | 9/2015 | Glunz |

FOREIGN PATENT DOCUMENTS

| | | |
|---|---|---|
| CN | 1535202 A | 10/2004 |
| CN | 101421074 | 4/2009 |
| CN | 102248163 | 11/2011 |
| CN | 1023320132 | 1/2012 |
| CN | 103213281 A | 7/2013 |
| CN | 103930780 A | 7/2014 |
| CN | 204263552 U | 4/2015 |
| CN | 108349163 A | 7/2018 |
| EP | 0156295 A2 | 10/1985 |
| EP | 0264674 | 4/1988 |
| EP | 1593797 | 11/2005 |
| EP | 2923824 A1 | 9/2015 |
| JP | H04329119 | 11/1992 |
| JP | 2011-156808 A | 8/2011 |
| JP | 2013-067036 | 4/2013 |
| WO | WO-2005-076799 | 8/2005 |
| WO | WO-2008144199 | 11/2008 |
| WO | WO-2014197086 | 12/2014 |

EXTRACTION OF DIGITALLY PRINTED BUILD MATERIAL

BACKGROUND

Three dimensional (3D) printers are becoming more ubiquitous as costs for the printers come down. 3D printers, also referred to as additive manufacturing machines, typically operate by using a material to generate a 3D object layer-by-layer. In some systems, a three dimensional computer aided drawing (CAD) model may be created. Then, an object may be generated in accordance with the model. Example materials may include polymers, metals, or plastic.

DETAILED DESCRIPTION

The present disclosure discloses a method and apparatus for extracting digitally printed build material from a 3D printer via a carrier. The carrier and the layers of build material that are digitally printed, but unbound, may be placed into a microwave furnace to be fused.

For example, portions of each layer of build material may be digitally printed with a liquid functional material on each printing pass. The liquid functional material "outlines" the portions of each layer that will form the three dimensional object after the build material is fused. Notably, in the present disclosure, each layer is not cured or fused after application of the liquid functional material to portions of each layer of the build material.

Rather, after portions of each layer of build material are digitally printed, the carrier containing the unbound layers build material that are digitally printed may be moved to a furnace to fuse the digitally printed portions of each layer of build material. In other words, the fusing of digitally printed layers of the build material occurs in the furnace, rather than within the 3D printer as with some other 3D printing techniques.

In contrast, some 3D printing processes heat and fuse each layer as each layer is being printed or immediately after each printing pass of a layer. By eliminating the heating process during or after each layer is printed, the efficiency of the 3D printing process and uniformity of material properties may be improved. In addition, the present disclosure allows for use of certain materials, such as ceramics, that require too high of temperatures for use in some 3D printers.

In addition, the present disclosure allows layers of build material that are digitally printed, but unbound, to be placed into a carrier and placed into a furnace (e.g., a microwave furnace, a furnace, a fusing chamber exposing the objects to electromagnetic radiation outside the range designated as microwave radiation). The furnace provides heat or energy that fuses the portions of the build material that received the liquid functional material to each other and between layers of the build material that received the liquid functional material. The portions of each layer of the layers of build material that are digitally printed with the liquid functional material may be fused simultaneously, or at the same time, within the carrier in a single operation.

Figure 1:
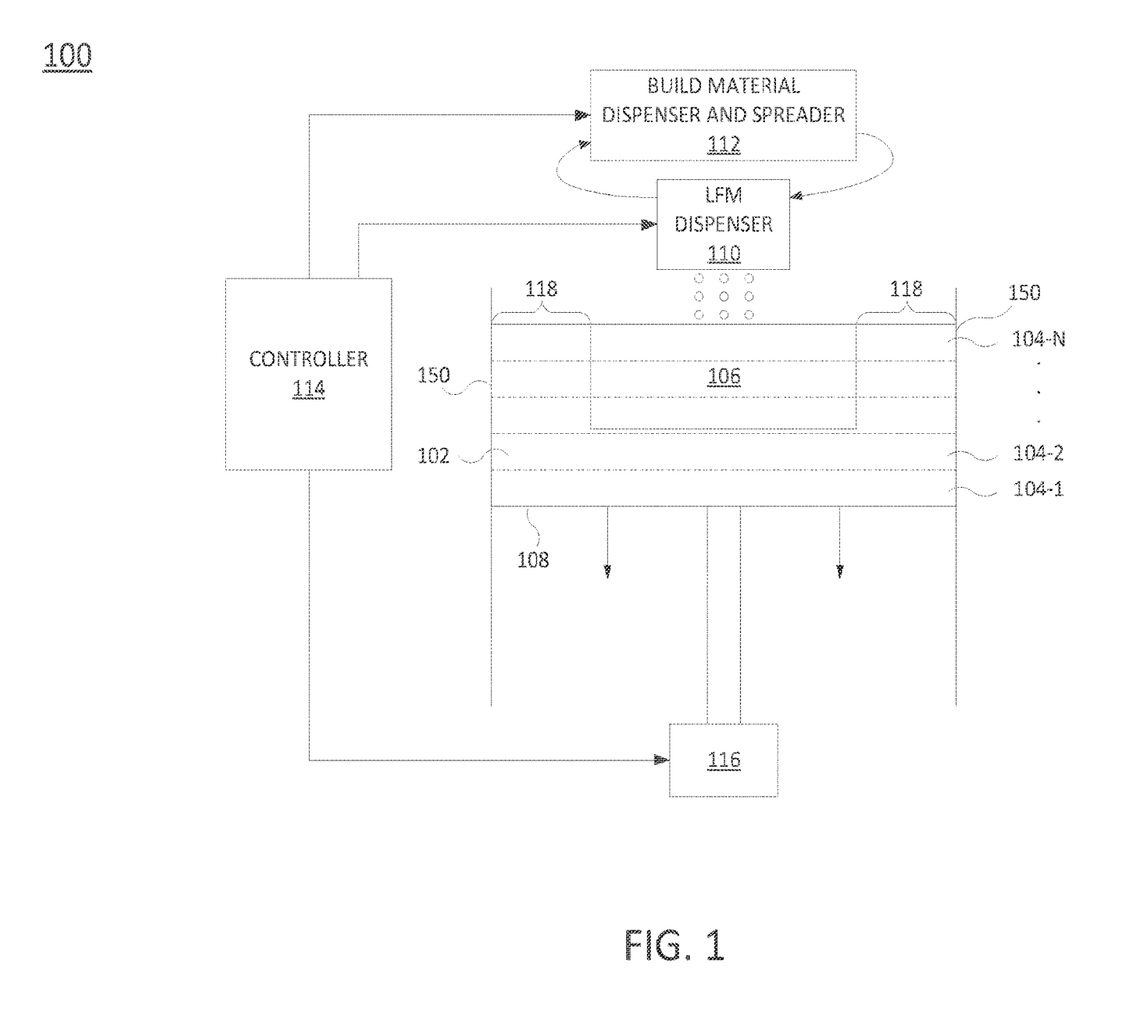
FIG. 1 is a block diagram of an example apparatus of the present disclosure.

FIG. 1 illustrates a block diagram of an example 3D printer 100 of the present disclosure. In one example, the 3D printer 100 may include a bed 108, a liquid functional material (LFM) dispenser 110 and a build material dispenser and spreader 112. In one implementation, the bed 108 may be coupled to a motor 116 to move the bed 108 up and down.

In one implementation, a controller 114 may be in communication with the LFM dispenser 110, the build material dispenser and spreader 112 and the motor 116. The controller 114 may control the build material dispenser and spreader 112 to dispense layers 104-1 to 104-N (herein referred to individually as a layer 104 or collectively as layers 104) of a build material 102. The controller 114 may control the LFM dispenser 110 to dispense LFM on portions of each layer 104 of build material 102. The controller 114 may control the motor 116 to move the bed 108 lower after each layer 104 is provided and digitally printed by the LFM to receive an additional layer 104 of build material 102. The controller 114 may also control the motor 116 to move the bed 108 higher to place layers 104-1 to 104-N into a carrier to be removed and placed into a furnace (e.g., a microwave furnace, a furnace, a fusing chamber exposing the objects to electromagnetic radiation outside the range designated as microwave radiation), as discussed in further details below.

In one example, the bed 108 may be coupled to the motor 116 via a mechanical connection. For example, the bed 108 may be coupled to a lead screw that is connected to the motor 116. The motor 116 may be a stepper motor that moves the lead screw in defined increments. The movement of the bed 108 in a downward direction may be referred to as indexing down and the movement of the bed 108 in an upward direction may be referred to as indexing up.

In one example, a structure 106 may be designed using, for example, a computer aided design (CAD) program and uploaded to the controller 114. In some implementations, bitmap slices of each layer or raster slices of each layer of a design of the structure 106 may be uploaded to the controller 114. The controller 114 may then control the LFM dispenser 110, the build material dispenser and spreader 112 and the motor 116 to digitally print the structure 106 in the layers 104 of the build material 102 without applying energy.

In one implementation, the build material 102 may be a microwave transparent material. In other words, the build material 102 may not absorb microwave energy or allows the microwave energy to pass through without altering the build material 102. Said another way, the build material 102 may not absorb microwave energy as well as another material (e.g., a liquid function material described below).

The microwave transparent material may be any type of granular material including a powder, a gel, a slurry, and the like, that is predominantly microwave transparent. The granular material may have an average diameter of approximately 3-30 microns ($\mu m$). For slurries and gels, the average diameter may be as small as 1 nanometer (nm). Examples of microwave transparent materials that can be used as the build material 102 may include alumina ($Al_2O_3$), silicon nitride (SiN), a ceramic, a glass ceramic, a glass, polytetrafluoroetheylen (PTFE), zirconium dioxide ($ZrO_2$), silicon dioxide ($SiO_2$), yttrium oxide ($Y_2O_3$), magnesium oxide (MgO), aluminum oxide ($Al_2O_3$), boron nitride (BN), calcium fluoride ($CaF_2$), tantalum pentoxide ($Ta_2O_5$), niobium pentoxide ($Nb_2O_5$), titanium oxide ($TiO_2$), quartz, fused silica, mullite, and the like.

A layer 104 of the build material 102 may be dispensed onto the bed 108 and rolled to be level, or even, by the build material dispenser and spreader 112. Based on the structure 106, the controller 114 may dispense LFM onto portions of the layer 104 of build material 102. The LFM may be a susceptor that absorbs microwave energy selectively better than the build material 102. The LFM may also be a material designed to decrease the local fusing temperature or otherwise locally modify the material properties of the digitally defined object. The layer 104 of the build material 102 is digitally printed by applying the LFM to the portions of the layer 104 of the build material 102 to create a susceptor pattern that corresponds to a respective layer of the structure 106. The LFMs may also be used to modify the local electrical or other fundamental properties of the build material 102 to create a benefit to the final structure 106.

It should be noted that the LFM is not a binder by itself and does not bind the particles of the build material 102 without application of energy. In other words, the LFM alone does not bind the particles of the build material 102. Rather an energy is applied to the LFM in a furnace, as described below to bind the build material 102.

An example of the LFM may include any type of material that is conducting, semi-conducting or have a magnetic dipole that can be used as microwave, or radio frequency (RF) susceptors at ambient temperature. Some examples may include carbon black, graphite, carbon nano tubes, silicon carbide (SiC), zinc oxide (ZnO), indium tin oxide (ITO), titanium nitride (TiN), ferrite inks, ferromagnetic materials, ferroelectric materials, and the like.

In addition, the LFMs may include materials designed to react with a base material to enable fusing with less fusing energy delivered. This may include silicon oxide ($SiO_2$) nano-particles, combinations of oxides to form glass in the interstitial regions between particles, and the like.

The dispensing of the build material 102 and the digital printing of portions of the layer 104 of the build material 102 may be repeated until the entire structure 106 is digitally printed within a plurality of layers 104-N of the build material 102. Notably, each layer 104 of the build material 102 is not heated or fused. Rather, the layers 104-1 to 104-N of the build material 102 remain loose or unbound.

In one implementation, additional layers 104 that are free from the LFM may be dispensed as a bottom most layer and a top most layer to provide insulation. In addition, the structure 106 may be digitally printed within each layer 104 of the build material 102 at a minimum distance 118 from walls 150 of the 3D printer and/or the carrier (discussed below) to provide an insulation layer. In one implementation, the minimum distance 118 may be approximately greater than or equal to 10 millimeters (mm).

As discussed below, the layers 104-1 to 104-N of the build material 102 may be inserted into a carrier. The carrier can be removed from the 3D printer 100 and inserted into a microwave furnace to fuse the digitally printed portions of each layer 104-1 to 104-N at the same time.

Figure 2:
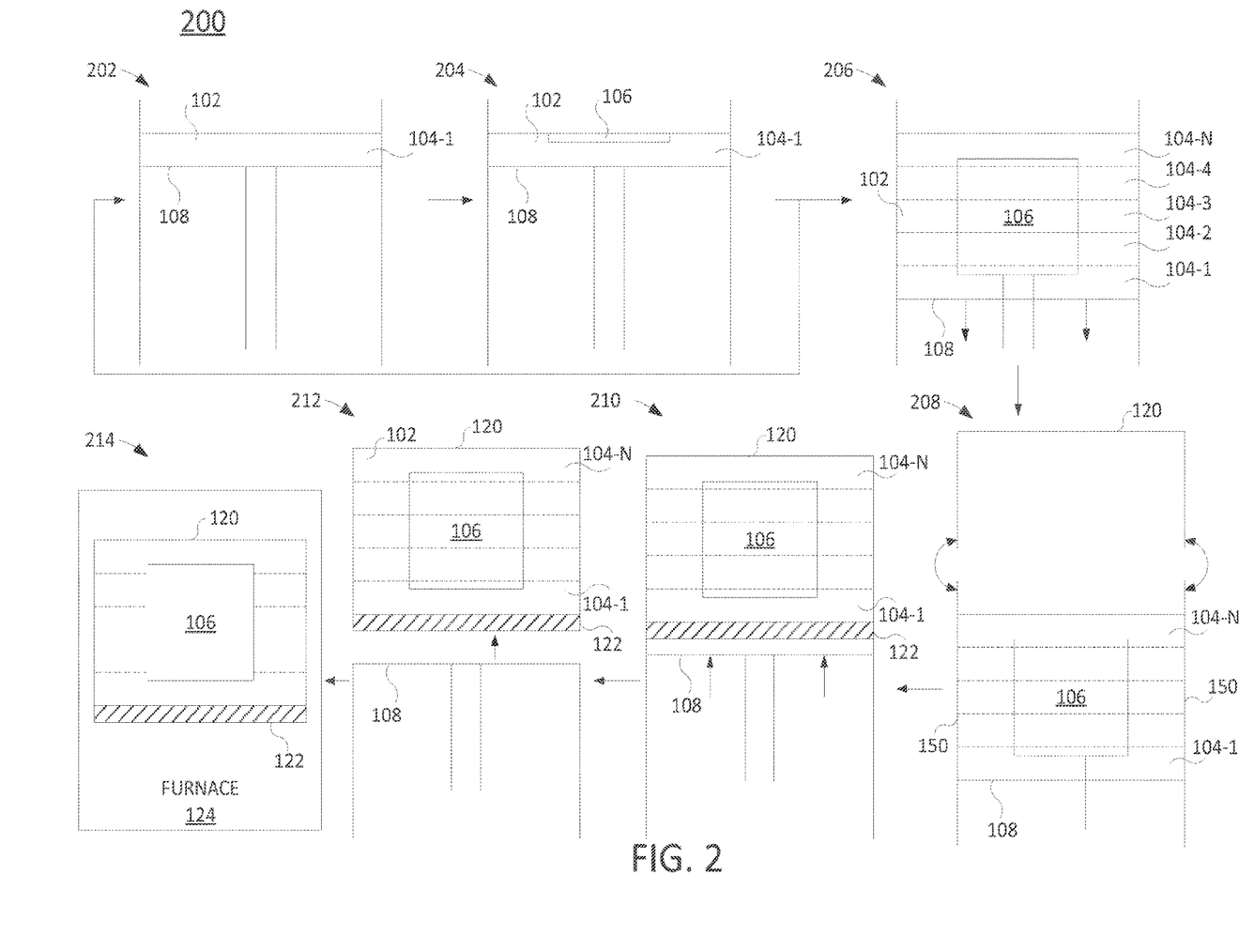
FIG. 2 is an example schematic flow diagram of the present disclosure.

FIG. 2 illustrates an example schematic flow diagram of a method 200 for extracting layers of build material that is unbound into a carrier. At block 202, a layer 104-1 of build material 102 may be dispensed onto the bed 108 of the 3D printer 100.

At block 204, the LFM may be dispensed onto selective portions of the layer 104-1 of the build material 102. After the LFM is dispensed, the bed 108 may be indexed down and return to block 202 to receive another layer 104-2 of building material 102. The blocks 202 and 204 may be repeated until an entire structure 106 is digitally printed into layers 104-1 to 104-N of the build material 102 as shown in block 206.

In one implementation, a filler material may also be inserted into the selected portions of the layer 104-1 of the build material 102. For example, the filler material may be mixed in with the build material 102 before the build material 102 is dispensed. The filler material may be used to increase the density of the build material 102 or to help drive the fusing process (discussed below). Examples of filler material that may be used may include nano-particles of ceramics, Sol-Gel, and the like.

At block 208, a carrier 120 may be coupled to the bed 108. The carrier 120 may be mechanically coupled to the walls 150 that surround the bed 108 (e.g., via fasteners, clips, and the like) or may be mechanically held above the bed 108 (e.g. via a mechanical arm, clamp, and the like). The carrier 120 may be comprised of a microwave transparent material. Examples of microwave transparent materials may include alumina, silicon nitride, a ceramic, a glass ceramic, a glass, polytetrafluoroetheylen (PTFE), zirconium dioxide ($ZrO_2$), silicon dioxide ($SiO_2$), yttrium oxide ($Y_2O_3$), magnesium oxide (MgO), aluminum oxide ($Al_2O_3$), boron nitride (BN), calcium fluoride ($CaF_2$), tantalum pentoxide ($Ta_2O_5$), niobium pentoxide ($Nb_2O_5$), titanium oxide ($TiO_2$), quartz, fused silica, mullite, and the like.

In one example, the carrier 120 may have dimensions that are the same as, or correspond to, the dimensions of the bed 108. For example, the shape (e.g., the outer perimeter) of the carrier 120 may be the same as the shape of the bed 108. The length and width of the outer perimeter of the carrier 120 may be the same as the length and width of the bed 108. The volume of the carrier 120 may be the same as the volume of the layers 104-1 to 104-N of the build material 102 on the bed 108, and so forth.

In one example, the walls 150 that surround the bed 108 may have a sensor or a detection system (not shown) to relay a signal to the controller 114 that the carrier 120 is attached. The signal that the carrier 120 is attached may allow the controller 114 to index the bed 108 up as described below.

At block 210, the bed 108 may be indexed up to move the layers 104-1 to 104-N into the carrier 120. In one example, the bed 108 may be indexed up when the controller 114 detects that the carrier 120 is attached. In one example, after the layers 104-1 to 104-N are extracted into the carrier 120, a base plate 122 may be inserted between a bottom most layer 104-1 and the bed 108. In one implementation, the base plate 122 may be comprised of a microwave transparent material or a reflective metal. For example, the base plate 122 may be a microwave transparent material when the carrier 120 is inserted into a completed microwave cavity. The base plate 122 may be made of, or may comprise, a reflective material when a base of the carrier 120 is designed to be an active part of the microwave cavity. The base plate 122 may seal the layers 104-1 to 104-N into the carrier 120. The base plate 122 may be mechanically coupled to, or attached to, the carrier 120 via a mechanical connection (e.g., a slot that the base plate 122 can slide into, a mechanical clamp, a locking tab, and the like).

Figure 5:
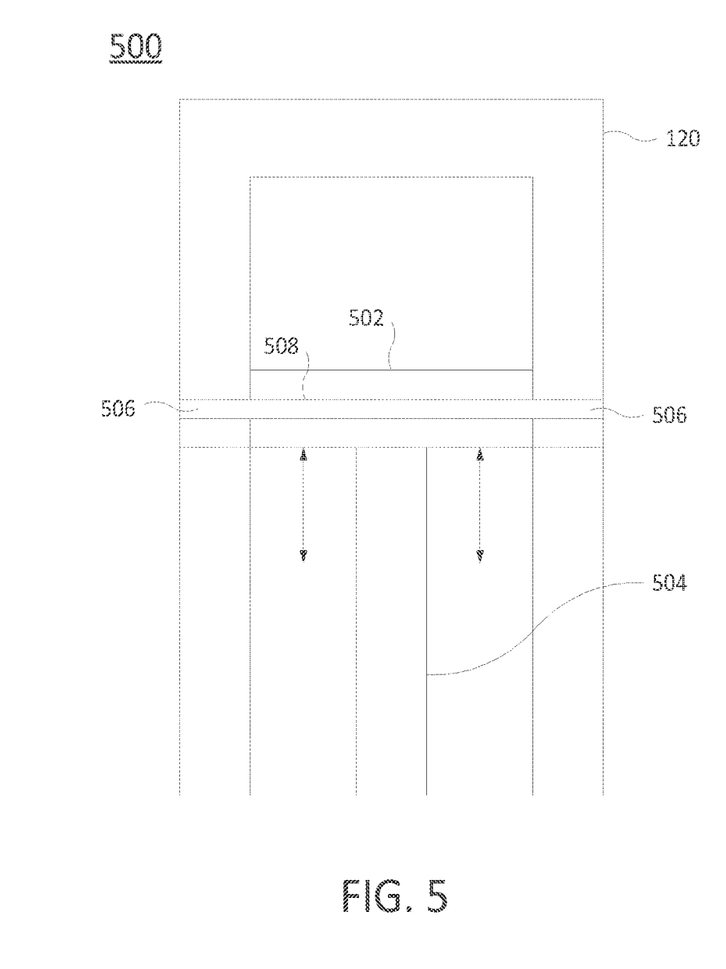
FIG. 5 is a front cross-sectional block diagram of an example carrier and base plate of the present disclosure.
Figure 6:
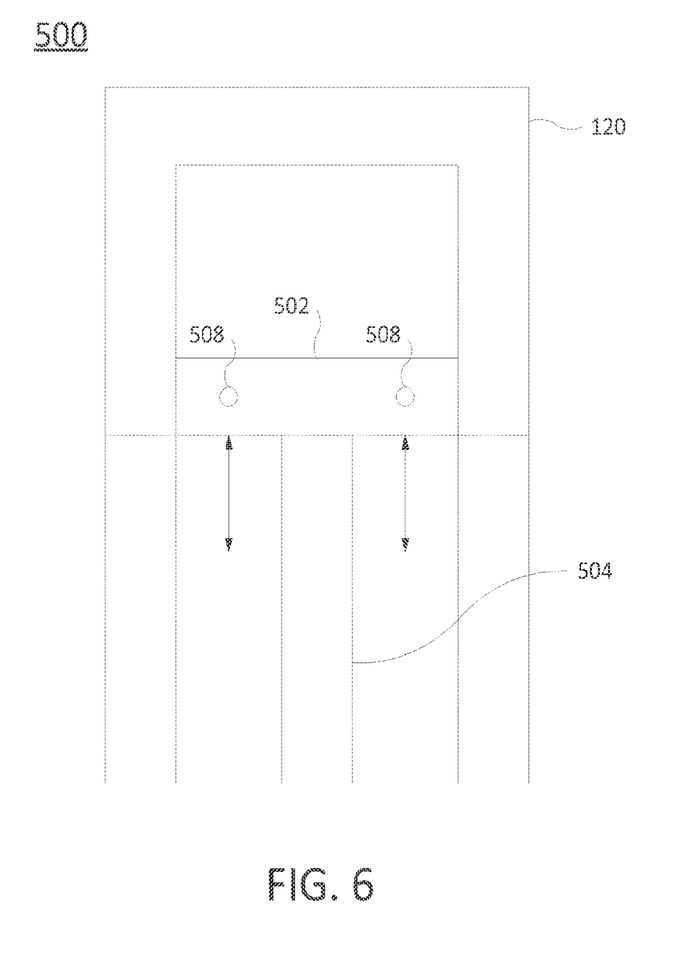
FIG. 6 is a side cross-sectional block diagram of an example carrier and base plate of the present disclosure.

FIGS. 5 and 6 illustrate another implementation of the base plate 122 and the carrier 120. FIG. 5 illustrates a front cross-sectional block diagram of a piston 502 and a ram 504 assembly. In one implementation, the piston 502 may serve as the bed 108 that the build material 102 is layered onto.

After the layers 104 of build material 102 is placed onto the piston 502, the piston 502 may be moved into the carrier 120 via the ram 504. The piston 502 may include an opening 508 and the carrier 120 may have openings 506 that correspond to the opening 508. In other words, the openings 508 of the piston 502 and the openings 506 of the carrier may be aligned and have a similar size and shape. The piston 502 and the carrier 120 may have any number of openings 508 and 506, respectively.

The piston 502 may be coupled to the carrier 120 via a mechanical device using the openings 508 and 506. For example, a rod, or any other mechanical device, may be inserted into the openings 508 and 506. After the piston 502 is coupled to the carrier 120, the piston 502 may be detached from the ram 504. For example, the piston 502 may be mechanically attached to the ram 504 (e.g., a screw, fastener, and the like), magnetically attached to the ram 504, and the like.

FIG. 6 illustrates a side cross-section block diagram of the piston 502 and the ram 504 assembly. FIG. 6 illustrates two openings 508. However, as noted above the piston 502 may have any number of openings 508.

At block 212, the carrier 120 with the base plate 122 may be removed from the bed 108 and the 3D printer. The carrier 120 and the base plate 122 may ensure that the layers 104-1 to 104-N remain stable inside the carrier 120 and the base plate 122. For example, the layers 104-1 to 104-N may be rolled and compacted after each layer 104 is dispensed and fill the carrier 120 without much space for movement. As noted above, each layer 104-1 to 104-N is not fused after portions of each layer 104 are digitally printed. Said another way, the layers 104-1 to 104-N remain unbound or unfused when transported in the carrier 120 with the base plate 122.

At block 214, the carrier 120 and the base plate 122 may be inserted into a furnace 124. The furnace 124 may be a microwave furnace. The furnace may fuse the portions of each layer 104 that were digitally printed with the LFM at the same time. As noted above, the LFM may be a susceptor that absorbs microwave energy selectively better than the surrounding build material 102 that does not receive the LFM. As a result, the defined structure 106 may be fused as illustrated in block 214 without the dashed lines of each layer 104. In one example, the excess build material 102 that is not fused may be removed and recycled. The carrier 120 may also be reused.

Figure 3:
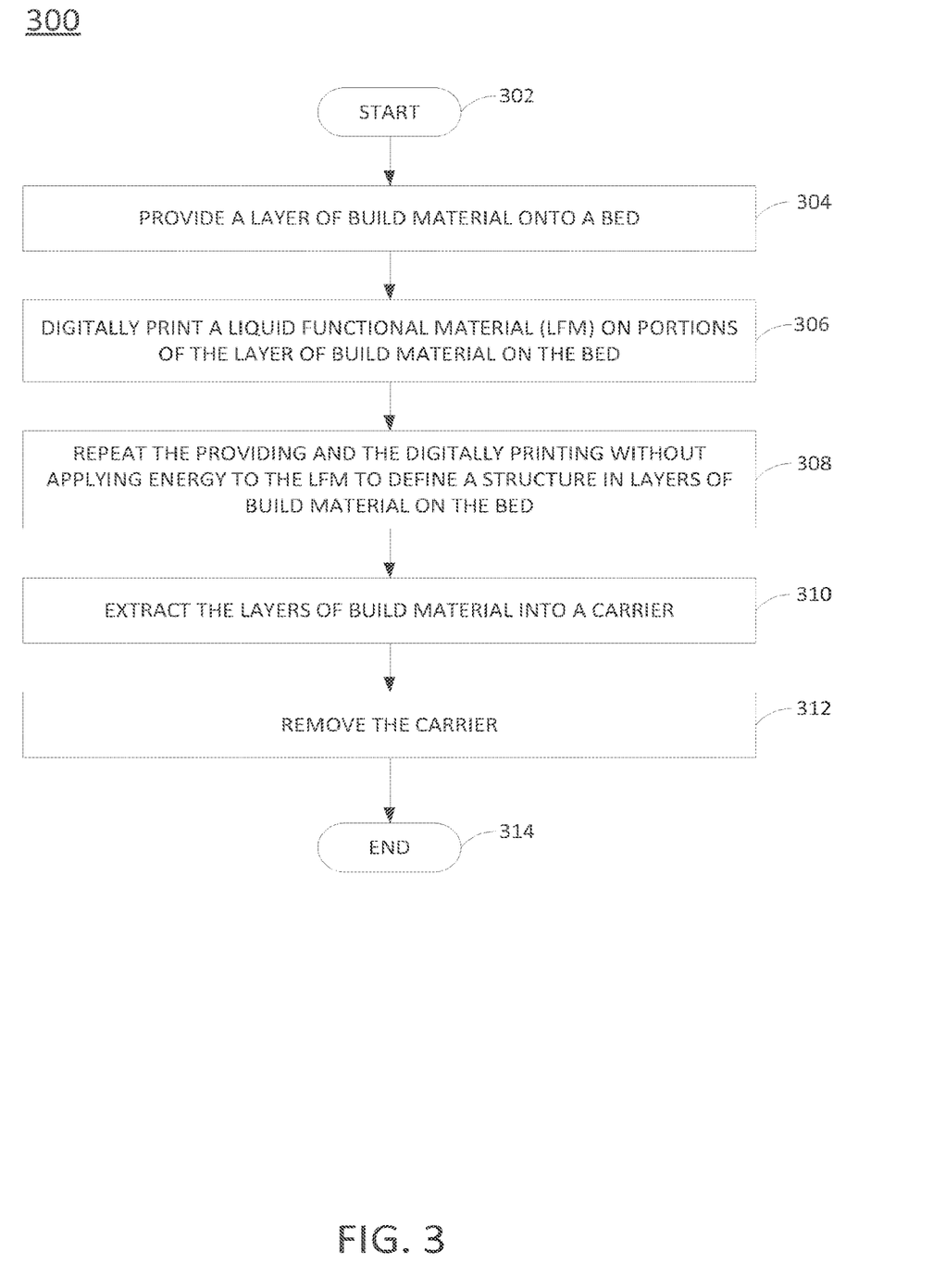
FIG. 3 is a flow diagram of an example method for extracting layers of build material that is unbound into a carrier.

FIG. 3 illustrates a flow diagram of an example method 300 for extracting layers of build material that are unbound into a carrier. In one example, the blocks of the method 300 may be performed by the controller 114 or using the 3D printer 100.

At block 302, the method 300 begins. At block 304, the method 300 provides a layer of build material onto a bed. In one example, the build material may be a microwave transparent material. The microwave transparent material may be a powder that is microwave transparent. Particles of the powder may have an average diameter of approximately 3-30 microns (μm). Examples of microwave transparent materials that can be used as the build material may include alumina, silicon nitride, a ceramic, a glass ceramic, a glass, polytetrafluoroetheylen (PTFE), zirconium dioxide ($ZrO_2$), silicon dioxide ($SiO_2$), yttrium oxide ($Y_2O_3$), magnesium oxide (MgO), aluminum oxide ($Al_2O_3$), boron nitride (BN), calcium fluoride ($CaF_2$), tantalum pentoxide ($Ta_2O_5$), niobium pentoxide ($Nb_2O_5$), titanium oxide ($TiO_2$), quartz, fused silica, or mullite, and the like.

At block 306, the method 300 digitally prints on portions of the layer of build material on the bed. For example, a LFM may be dispensed onto the portions of the layer of build material that will define a structure. The LFM may be a susceptor that absorbs microwave energy selectively better than the build material. The LFM may be applied to the portions of layer of build material to create a susceptor pattern that corresponds to a respective layer of the structure 106.

At block 308, the method 300 repeats the providing and the digitally printing to define a structure in layers of build material on the bed. For example, the structure may be defined or digitally printed layer by layer. In other words, a layer of build material may be added, portions of the layer of build material may be digitally printed by applying the LFM to the select portions, another layer of build material may be added on top of the previous layer of build material, portions of the new layer of build material may be digitally printed, and so forth, until enough layers of build material are digitally printed to define the structure.

At block 310, the method 300 extracts the layers of build material that are unbound into a carrier that is placed over the bed. For example, a carrier may be mechanically coupled to or held over the bed. The layers of build material may remain unbound (e.g., each layer is not heated or fused after being digitally printed). The bed may be indexed up into the carrier until the layers of build material that are digitally printed and unbound are located within the carrier. A base plate may be mechanically coupled to the bottom of the carrier to seal the layers of build material into the carrier.

In one implementation, the carrier may comprise a microwave transparent material. Examples of microwave transparent materials may include alumina, silicon nitride, a ceramic, a glass ceramic, a glass, polytetrafluoroetheylen (PTFE), zirconium dioxide ($ZrO_2$), silicon dioxide ($SiO_2$), yttrium oxide ($Y_2O_3$), magnesium oxide (MgO), aluminum oxide ($Al_2O_3$), boron nitride (BN), calcium fluoride ($CaF_2$), tantalum pentoxide ($Ta_2O_5$), niobium pentoxide ($Nb_2O_5$), titanium oxide ($TiO_2$), quartz, fused silica, mullite, and the like. The base plate may comprise a microwave transparent material or a reflective metal. For example, the base plate may be a microwave transparent material when the carrier is inserted into a completed microwave cavity. The base plate may be a reflective material when a base of the carrier is designed to be an active part of the microwave cavity.

At block 312, the method 300 removes the carrier. For example, the sealed carrier containing the unbound layers of build material having the digitally printed structure may be removed from the bed and the 3D printer. The entire carrier may be placed into a microwave furnace. The microwave furnace may fuse the structure that is digitally printed in the layers of build material in the carrier. In other words, rather than fusing portions of each layer of the build material after each pass, the present disclosure may fuse each layer of build material that is digitally printed simultaneously, or at the same time, inside the furnace and within the carrier. At block 314, the method 300 ends.

Figure 4:
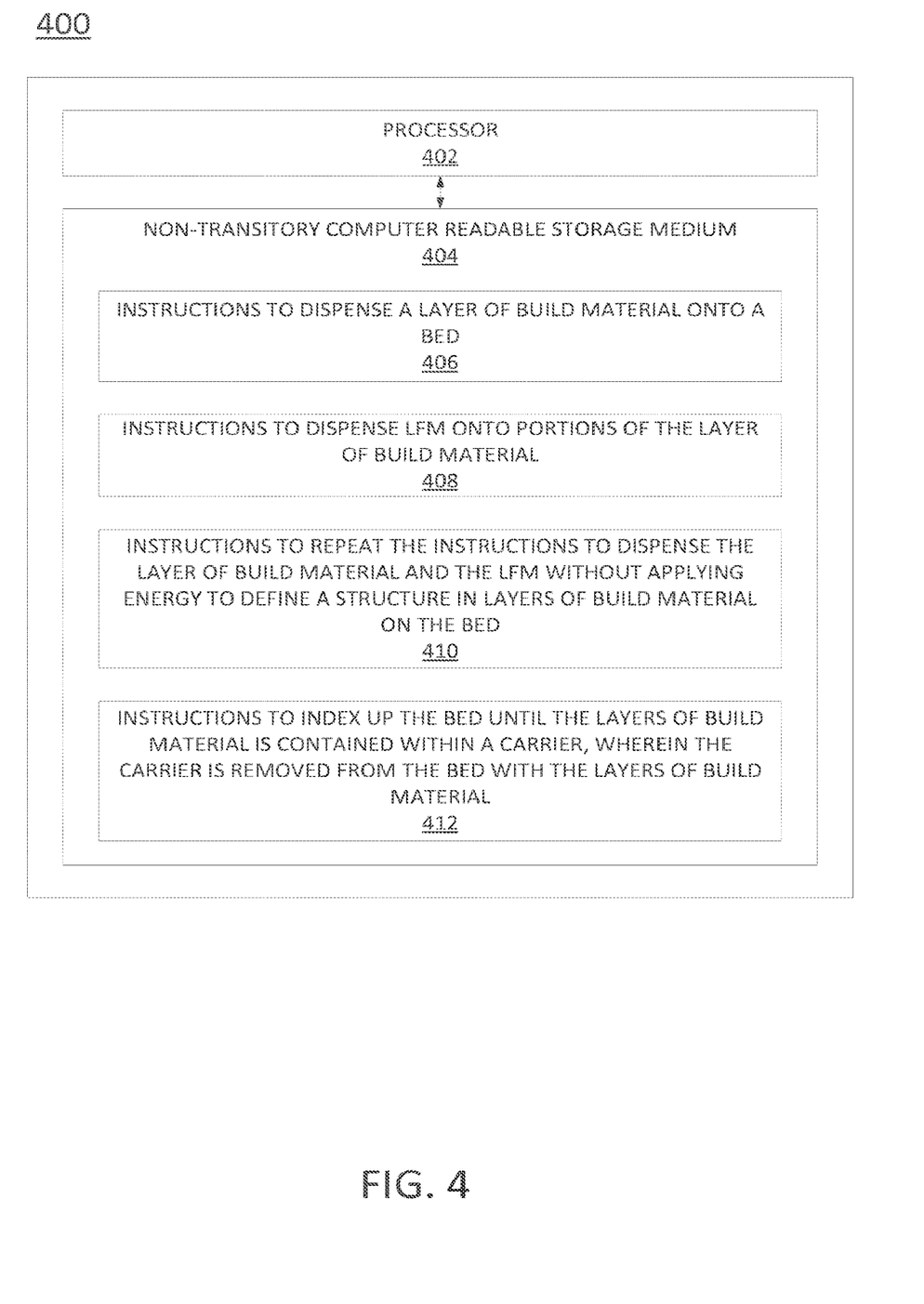
FIG. 4 is a block diagram of an example controller of the present disclosure.

FIG. 4 illustrates another example of an apparatus 400. In one example, the apparatus 400 may also be the controller 114. In one example, the apparatus 400 may include a processor 402 and a non-transitory computer readable storage medium 404. The non-transitory computer readable storage medium 404 may include instructions 406, 408, 410 and 412 that when executed by the processor 402, cause the processor 402 to perform various functions.

In one example, the instructions 406 may include instructions to dispense a layer of build material onto a bed. The instructions 408 may include instructions to dispense LFM onto portions of the layer of build material. The instructions 410 may include instructions to repeat the instructions to dispense the layer of build material and the LFM to define a structure in layers of build material on the bed. The instructions 412 may include instructions to index up the bed until the layers of build material that are unbound is contained within a carrier that is placed over the bed, wherein the carrier is removed from the bed with the layers of build material.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus for forming a specified object, the apparatus comprising:
a bed to receive a succession of layers of a build material;
a liquid functional material (LFM) dispenser to selectively dispense LFM on each layer of the build material in accordance with a cross-section of the object to be formed;
a supply of LFM for the LFM dispenser, wherein the LFM is not a binder that binds the build material, the LFM facilitating binding of the build material under an application of energy; and
a carrier to receive the succession of unbound build material layers comprising selectively placed LFM.

2. The apparatus of claim 1, further comprising a furnace to receive the carrier, the furnace to apply the energy to the build material in the carrier to bind the build material that received the LFM in all the successive layers to form the object within the carrier.

3. The apparatus of claim 2, wherein the furnace is arranged to apply the energy to all the build material that received LFM in all of the layers at a same time to bind the build material that receive the LFM into the object.

4. The apparatus of claim 1, wherein the LFM reacts with the build material that receives the LFM, the reaction lowering an amount of energy required to bind the build material that has reacted with the LFM.

5. The apparatus of claim 2, wherein the LFM comprises an energy susceptor that is responsive to energy applied by the furnace to induce binding of the build material that received the LFM.

6. The apparatus of claim 1, farther comprising a motor for:
indexing the bed downward as each successive layer of build material is formed and receives LFM; and
indexing the bed upward into the carrier when extracting the layers of build material into the carrier.

7. The apparatus of claim 1, wherein supply of LFM comprises an agent selected from a group consisting of carbon black, graphite, carbon nanotubes, silicon carbide (SiC), zinc oxide (ZnO), indium tin oxide (ITO), titanium nitride (TiN), ferrite inks, ferromagnetic materials, and ferroelectric material.

8. A method of operating the apparatus of claim 1, the method comprising:
successively forming layers of the build material on the bed;
with the liquid functional material (LFM) dispenser, selectively dispensing the LFM on each layer of the build material in accordance with a cross-section of an object to be formed, wherein the LFM facilitates binding of the build material under an application of energy but does not, by itself, bind the build material; and
extracting the layers of build material into the carrier prior to the application of energy to bind the build material that received the LFM.

9. The method of claim 8, further comprising
placing the carrier into a furnace;
with the furnace, applying the energy to the build material in the carrier to bind the build material that received the LFM in all the successive layers to form the object within the carrier.

10. The method of claim 9, wherein all the build material that received LFM in all of the layers is bound together at a same time by the application of energy from the furnace.

11. The method of claim 8, further comprising reacting the LFM with the build material that receives the LFM, the reaction lowering an amount of energy required to bind the build material that has reacted with the LFM.

12. The method of claim 9, further comprising using the LFM as an energy susceptor to energy applied by the furnace to induce binding of the build material that received the LFM.

13. The method of claim 8, further comprising forming a bottom-most and top-most layer of build material in the succession of layers, the bottom-most and top-most layers being free from any LFM and acting as insulation for intervening layers of build material.

14. The method of claim 8, further comprising:
indexing the bed downward as each successive layer of build material is formed and receives LFM; and
indexing the bed upward into the carrier when extracting the layers of build material into the carrier.

15. The method of claim 8, wherein the liquid function material comprises an agent selected from a group consisting of carbon black, graphite, carbon nanotubes, silicon carbide (SiC), zinc oxide (ZnO), indium tin oxide (ITO), titanium nitride (TiN), ferrite inks, ferromagnetic materials, and ferroelectric material.

16. The method of claim 8, further comprising, after the layers of build material are extracted into the carrier, sealing the carrier with a base plate.

17. The method of claim 8, wherein the carrier comprises a microwave transparent material.

18. An apparatus for forming a specified object, the apparatus comprising:
a bed to receive a succession of layers of a build material;
a liquid functional material (LFM) dispenser;
a carrier to receive the succession of unbound build material layers comprising selectively placed LFM; and
a controller programmed to control the bed and LFM dispenser for successively forming the layers of build material on the bed; selectively dispensing a liquid functional (LFM) on each layer of the build material in accordance with a cross-section of the object to be formed; and
extracting the layers of build material in an unbound state into a carrier prior to the application of energy to bind the build material that received the LFM.

19. The apparatus of claim 18, further comprising a supply of LFM for the LFM dispenser, wherein the LFM facilitates binding of the build material under an application of energy but does not, by itself, bind the build material.

20. The apparatus claim 18, further comprising a furnace to receive the carrier, the furnace to apply the energy to all the build material in the carrier to simultaneously bind the build material that received the LFM in all the successive layers to form the object within the carrier.

\* \* \* \* \*